Aug. 11, 1970    L. L. ROGERS 3RD    3,523,312
CLAMP

Filed Aug. 12, 1968    3 Sheets-Sheet 1

INVENTOR
LEWIS L. ROGERS, III.

BY *Kimmel, Crowell & Weaver*

ATTORNEYS

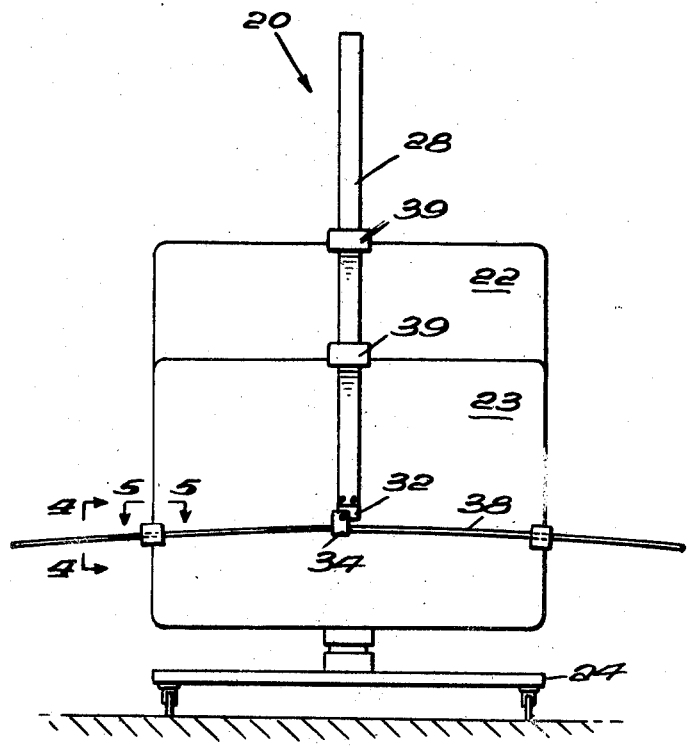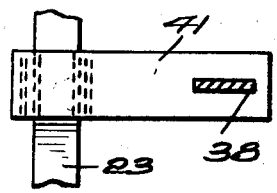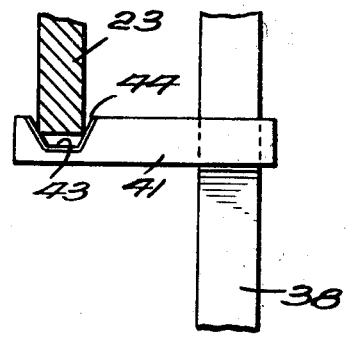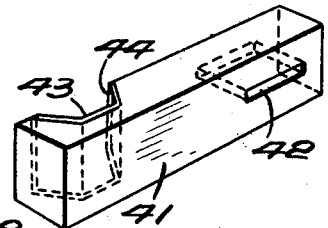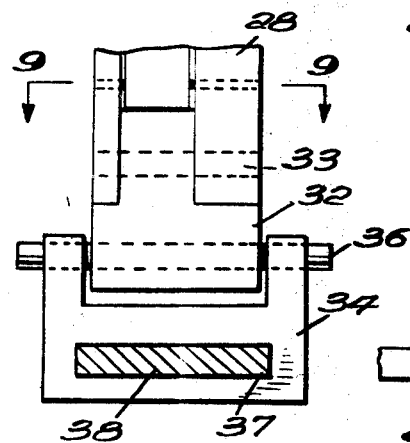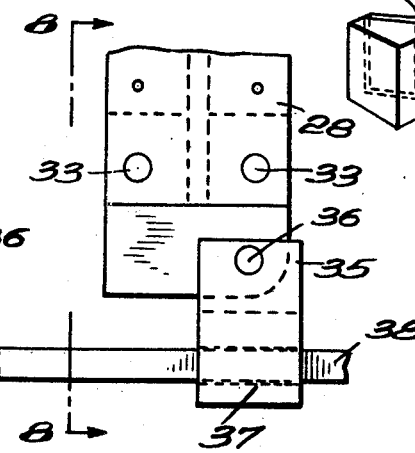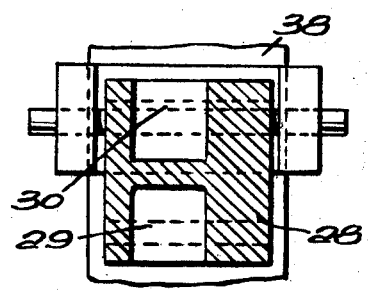

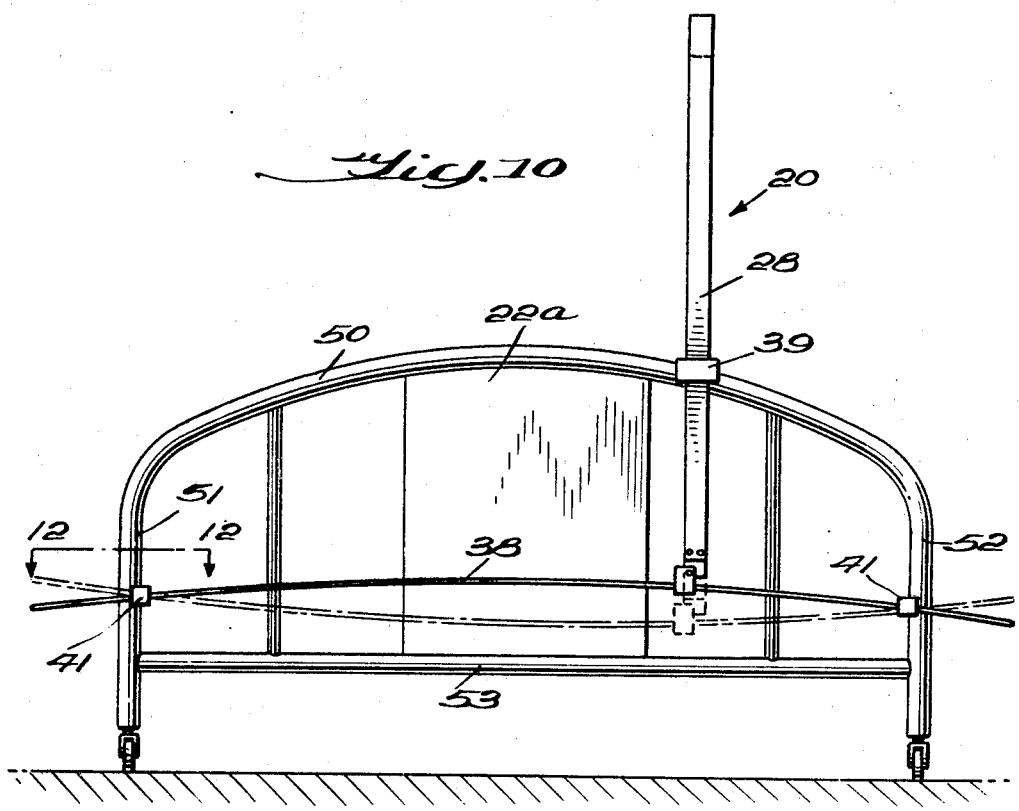
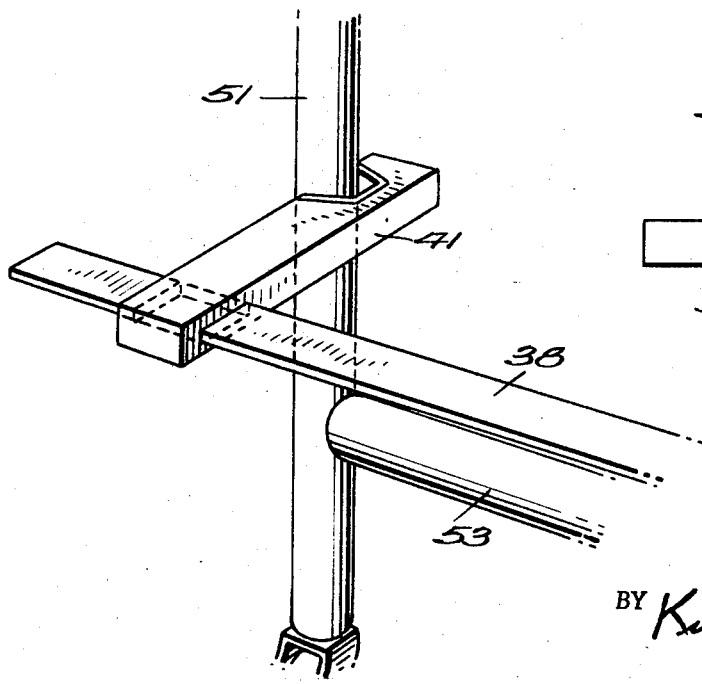
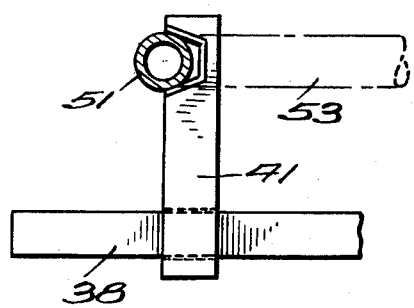

United States Patent Office 3,523,312
Patented Aug. 11, 1970

---

3,523,312
CLAMP
Lewis L. Rogers 3rd, 43 N. Franklin St.,
Wilkes-Barre, Pa. 18701
Filed Aug. 12, 1968, Ser. No. 752,042
Int. Cl. A47c 21/00
U.S. Cl. 5—327            8 Claims

ABSTRACT OF THE DISCLOSURE

A clamp which may be used for an invalid support structure and can be hand adjusted and hand clamped to beds of varying heights and widths is disclosed. The adjustments are held by cam action and the clamps are spring biased to improve the clamping action.

SUMMARY OF THE INVENTION

The present invention is directed to a clamp for securing of a support to an object such as a bed, table, bench, or the like. The clamp includes an upright post which can be vertically adjusted, and the clamp may be attached to objects of varying designs and sizes, and can be moved from object to object without the use of tools of any kind.

The primary object of the invention is to provide a clamp which is sturdy in operation, easy to assemble and disassemble onto an object, and which can be adjusted in height and to fit objects of various designs and sizes.

Another object of the invention is to provide a clamp of the class described above which is inexpensive to manufacture and can be assembled and disassembled without the use of tools.

Other objects and advantages will become apparent in the following specification when considered in the light of the attached drawings.

DESCRIPTION OF THE DRAWINGS

FIG. 3 is an end elevation of the invention looking at the foot of the bed with the invention attached thereto;

FIG. 4 is an enlarged fragmentary vertical cross-section taken along the line 4—4 of FIG. 3 looking in the direction of the arrows;

FIG. 5 is an enlarged fragmentary horizontal cross-section taken along the line 5—5 of FIG. 3 looking in the direction of the arrows;

FIG. 6 is a perspective view of one of the clamping blocks;

FIG. 7 is an enlarged fragmentary and elevation of a detail of the invention;

FIG. 8 is a fragmentary vertical cross-section taken along the line 8—8 of FIG. 7 looking in the direction of the arrows;

FIG. 9 is a fragmentary horizontal cross-section taken along the line 9—9 of FIG. 8 looking in the direction of the arrows;

FIG. 10 is an end elevation of the invention shown attached to a different style of bed;

FIG. 11 is an enlarged fragmentary perspective view of the device as illustrated in FIG. 10; and FIG. 12 is an enlarged fragmentary horizontal cross-section taken on the line 12—12 of FIG. 10 looking in the direction of the arrows.

DESCRIPTION OF THE PREFERRED EMBODIMENT

Figure 1:
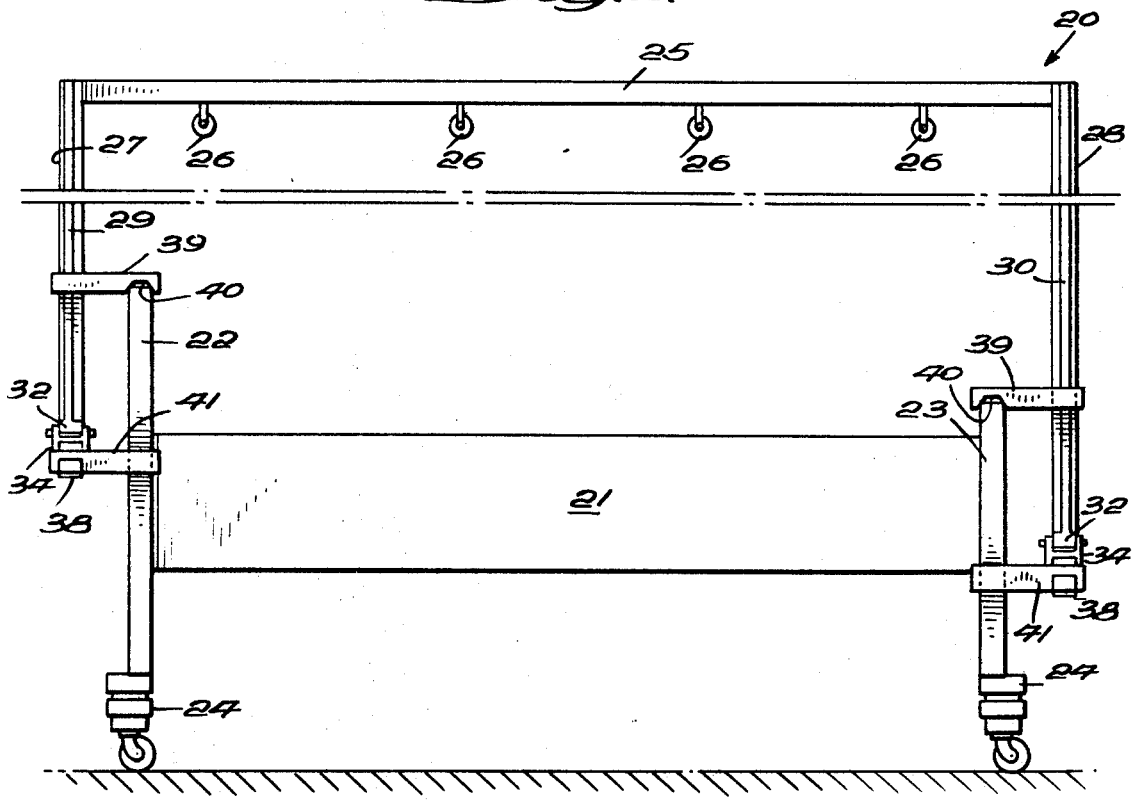
FIG. 1 is a side elevation of the invention shown partially broken away for convenience of illustration.
Figure 2:
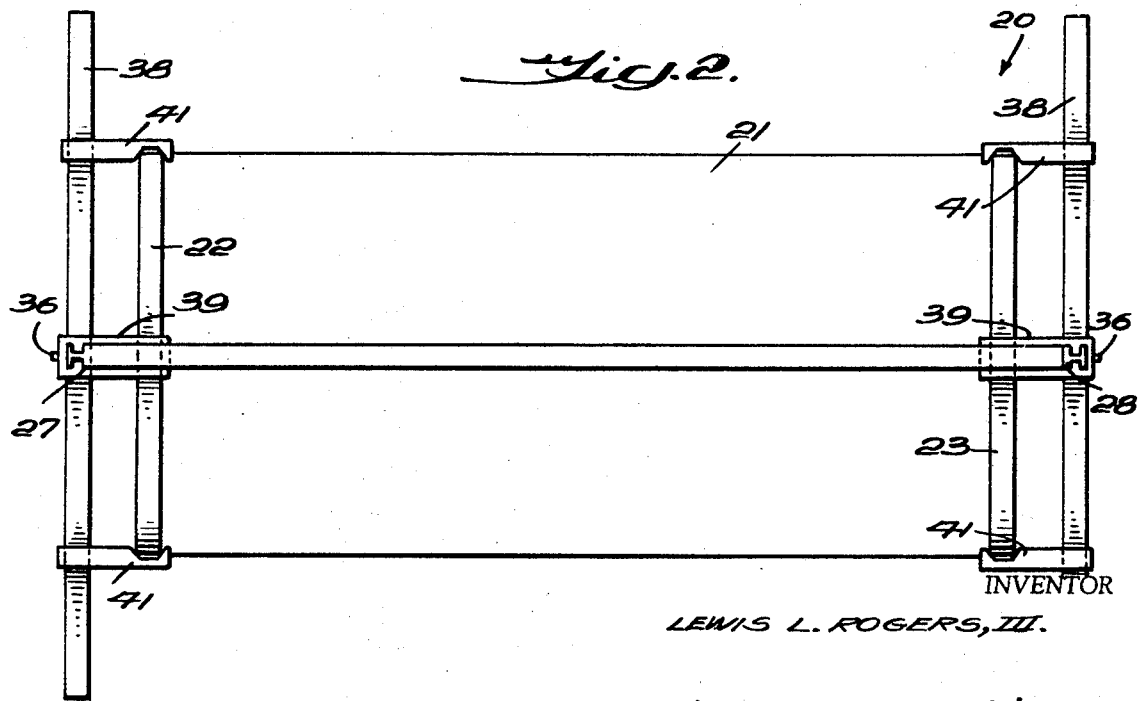
FIG. 2 is a top plan view of the invention shown partially broken away for convenience of illustration.

Referring now to the drawings in detail, wherein like reference characters indicate like parts throughout the several figures, the reference numeral 20 indicates generally a clamp constructed in accordance with the invention.

The clamp 20 is adapted to be attached to a bed 21 which, as illustrated here, is a hospital bed of the type having a solid headboard 22, a solid footboard 23, and a supporting base 24 under each.

The clamp 20 as shown herein supports a horizontal bar 25 having a plurality of attachment devices 26 secured thereto in horizontally spaced relation. The horizontal bar 25 is secured to an upright post 27 at one end and a second upright post 28 at the opposite end. The horizontal bar 25 has a length greater than the length of the bed 21, and the posts 27, 28 are positioned spaced from and parallel to the headboard 22 and the footboard 23. The posts 27, 28 are identical in every respect and are of a generally H-shape in horizontal cross-section as can be clearly seen in FIG. 9 and have a pair of oppositely disposed vertically extending channels 29, 30 formed therein. A base block 32 is of a generally rectangular configuration and is secured to the lower end of each of the posts 27, 28 by means of pins 33. A bracket 34 is provided with a pair of upstanding ears 35 which are positioned on opposite sides of the base block 32 and pivotally secured thereto by pin 36. The bracket 34 has an opening 37 of generally rectangular configuration extending therethrough transversely thereof in generally a horizontal plane. An elongated generally rectangular relatively flexible spring member 38 extends through the opening 37 in the bracket 34 and projects outwardly on each side thereof.

A generally rectangular clamp member 39 is mounted for vertical sliding movement on the posts 27 and 28 and is provided with a recessed jaw 40 in the end thereof extending over the headboard 22 and the footboard 23. The clamp members 39, when grasped adjacent the posts 27 and 28, may be readily slid vertically thereon; however, pressure on the end of the clamp member 39 away from the posts 27, 28 will cause the clamp member 39 to bind in the channels 29, 30 of the posts 27, 28 in a camming fashion so that further sliding movement is completely prevented. Generally rectangular clamp members 41 are each provided with openings 42 for sliding engagement on opposite ends of the spring member 38. The clamp members 41 are each provided with a recessed jaw portion 43 for engagement with the side edges of the headboard 22 and footboard 23. The jaw recesses 43 and 40 are each lined with resilient nonskid material 44 to prevent slipping of the clamp members 41 on the bed 21 and to additionally prevent damage to the bed 21 caused by the clamp members 41.

In the use and operation of the invention, clamp 20 is positioned adjacent a bed 21 and the jaw members 41 are brought into engagement with the side edges of the footboard 23 and the headboard 22. The clamp members 41 slide easily on the member 38 when alined therewith, but when canted with respect thereto will grip the member 38 and prevent sliding movement with respect thereto. The clamp member 39 is then engaged with the top edge of the headboard 22 and the footboard 23, and the posts 27 and 28 are raised to bow the spring member 38 into the position illustrated in FIG. 3 to maintain tension on all of the clamp members 39, 41.

When it is desired to remove the clamp 20 from the bed 21, the posts 27, 28 are raised slightly against the tension of the spring member 38 to release the clamp members 39 so that they can be slid upwardly out of engagement with the headboard 22 and the footboard 23.

In FIGS. 10 through 12, the clamp 20 is shown attached to the head of a bed 22a having a tubular frame member 50 of generally U-shaped form including integral upright side members 51, 52 and a tubular cross member 53. Several methods of attaching the clamp 20 to a bed are illustrated in the several figures. In FIG. 3, the clamp members 41 are positioned on the outside of and bind inwardly on the head and foot board of the bed. In FIGS. 10 through 12, the clamp members are shown engaging on the inside of the uprights 51, 52 and the flexible spring member 38 is shown as being bowed either upwardly or downwardly. These views also illustrate that the posts 27 and 28 may be in any transverse position desired with respect to the bed.

While the invention has been illustrated as an attachment for a bed, it is clear that the clamp is of general utility and may be used to attach a support to any desired object.

Having thus described the preferred embodiment of the invention, it should be understood that numerous structural modifications and adaptations may be resorted to without departing from the spirit of the invention.

I claim:

1. An invalid support for a bed of the type having a head and a foot arranged at opposite ends of the bed in parallel relation, comprising,
   a generally horizontal bar extending longitudinally of the bed in overlying relation thereto,
   a post rigidly secured to each end of said bar, and depending therefrom in outwardly spaced parallel relation to the head and foot, respectively,
   a clamp member slidably mounted on each of said posts for engagement with the top of the respective head and foot,
   a transverse member underlying the lower end of each of said posts,
   means securing said transverse member to the lower end of each of said posts, and
   a clamp member slidably mounted on each end of each of said transverse members for engagement with the sides of said head and said foot, said clamp member each loosely fitting said posts and said transverse members for easy sliding movement thereon when in alined relation and adapted to bind against said post members and said transverse members, respectively, when canted with respect thereto,
   said transverse member being formed of spring material and biasing said clamp members into clamping engagement with said head.

2. The structure as set forth in claim 1 wherein said posts are of generally H-shaped configuration in horizontal cross-section.

3. A device as claimed in claim 1 wherein a block is secured to the lower end of each of said posts and the means securing said transverse members to said posts includes a bracket through which said transverse member extends with said bracket pivotally secured to said block.

4. The device set forth in claim 1 wherein each of said clamp members is provided with a recess jaw lined with a resilient nonslip material.

5. The invention as set forth in claim 2 wherein said generally H-shaped posts are provided with oppositely disposed vertically extending channels.

6. A clamp for securing a support to an object comprising
   an upstanding post,
   a clamp member slidably mounted on said post for engagement with a horizontal edge of an object,
   a resilient transverse member formed of spring material underlying the lower end of said post,
   means securing said transverse member to the lower end of said post, and
   a clamp member slidably mounted on each end of said transverse member for engagement with vertical edges of an object, said clamp members respectively loosely fitting said post and said transverse member for easy sliding movement thereon when in alined relation and adapted to clamp said post member and said transverse member, respectively, when canted with respect thereto.

7. A device as claimed in claim 6 wherein a block is secured to the lower end of said post and the means securing said transverse member to said post includes a bracket through which said transverse member extends with said bracket pivotally secured to said block.

8. The device set forth in claim 6 wherein each of said clamp members is provided with a recess jaw lined with a resilient nonslip material.

References Cited

UNITED STATES PATENTS

| 1,906,369 | 5/1933 | Christie | 5—317 X |
| 2,840,241 | 6/1958 | Callais | 211—86 |

BOBBY R. GAY, Primary Examiner

A. M. CALVERT, Assistant Examiner

U.S. Cl. X.R.

248—226.2